United States Patent [19]
Sabatka

[11] 3,896,829
[45] July 29, 1975

[54] APPARATUS FOR SPRAYING AND OTHERWISE TREATING PIECES IN A VAPOR

[75] Inventor: Winston E. Sabatka, Minneapolis, Minn.

[73] Assignee: Finishing Equipment, Inc., Minneapolis, Minn.

[22] Filed: July 2, 1973

[21] Appl. No.: 375,763

Related U.S. Application Data

[63] Continuation-in-part of Ser. No. 171,129, Aug. 12, 1971, abandoned.

[52] U.S. Cl. ............... 134/58 R; 134/107; 134/135; 134/143
[51] Int. Cl. ....... B08b 3/02; B08b 3/10; B08b 15/02
[58] Field of Search ...... 134/58 R, 94, 99, 103–105, 134/107–109, 133, 134, 135, 148, 140, 143, 164, 165

[56] References Cited
UNITED STATES PATENTS

| | | | |
|---|---|---|---|
| 1,312,414 | 8/1919 | Monte | 134/143 X |
| 2,057,177 | 10/1936 | Wolff | 134/105 X |
| 2,442,272 | 5/1948 | Jaffa | 134/108 |
| 3,329,581 | 7/1967 | Wadman | 134/105 X |
| 3,414,249 | 12/1968 | Mescher et al. | 134/134 X |
| 3,632,480 | 1/1972 | Surprenant et al. | 134/105 X |

FOREIGN PATENTS OR APPLICATIONS

| | | | |
|---|---|---|---|
| 114,156 | 6/1945 | Sweden | 134/143 |

*Primary Examiner*—Robert L. Bleutge

[57] ABSTRACT

An open top treatment tank is used for chemically treating work pieces with a volatile treatment fluid having a liquid phase and a heavier-than-air vapor phase. Energy from a heat source boils the liquid phase in the tank at a rate to maintain the vapor phase to have a predetermined upper vapor level in the tank. Peripheral cooling coils near the top of the tank limit the upper surface level of the vapor phase. A stage is provided to lower the work pieces to be treated into the vapor phase in the tank where vapor condenses on the relatively cold work. Additional energy is supplied to the liquid phase to generate sufficient vapor to make up for that condensed and to maintain the upper level of the vapor phase substantially at the aforesaid predetermined upper level. A treatment tank lid or gate comes into closing relation to the open tank top after the stage has brought the work into the tank. A vertically upstanding collar extends upwardly of the lid around the entire periphery of the tank. An agitated spray of volatile fluid is directed against the work while the lid is in place. When the processing has been completed on the work, the stage and work are hoisted from the tank at a controlled rate to allow liquid on the stage and work to drain back into the tank and to allow generation of vapor sufficient to make up for the displacement volume of the stage and work without substantially changing the upper level of the vapor phase. An upper, air tight chamber can be provided to encompass the stage from the time it leaves an outside loading dock until it passes into the treatment tank. A second lid or gate closes the stage entrance from the loading dock. Vapor phase treatment fluid escaping into the chamber is recovered and returned.

12 Claims, 8 Drawing Figures

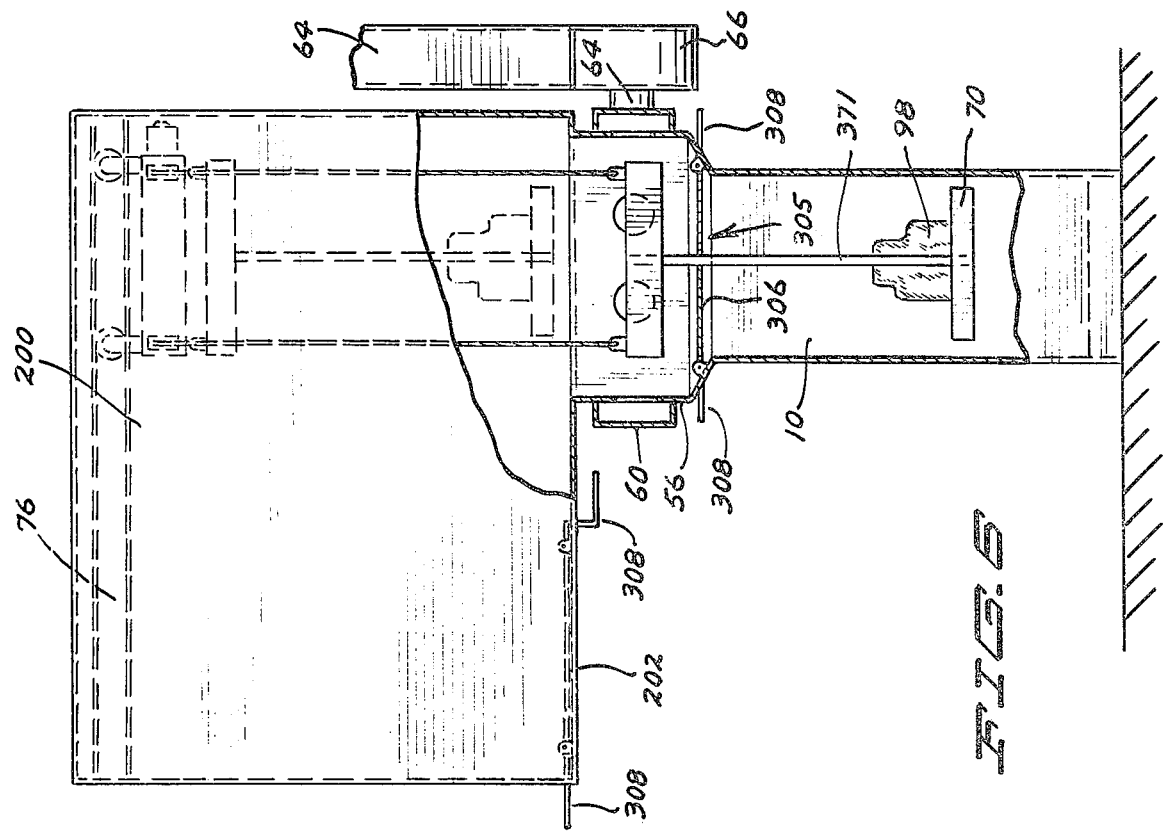
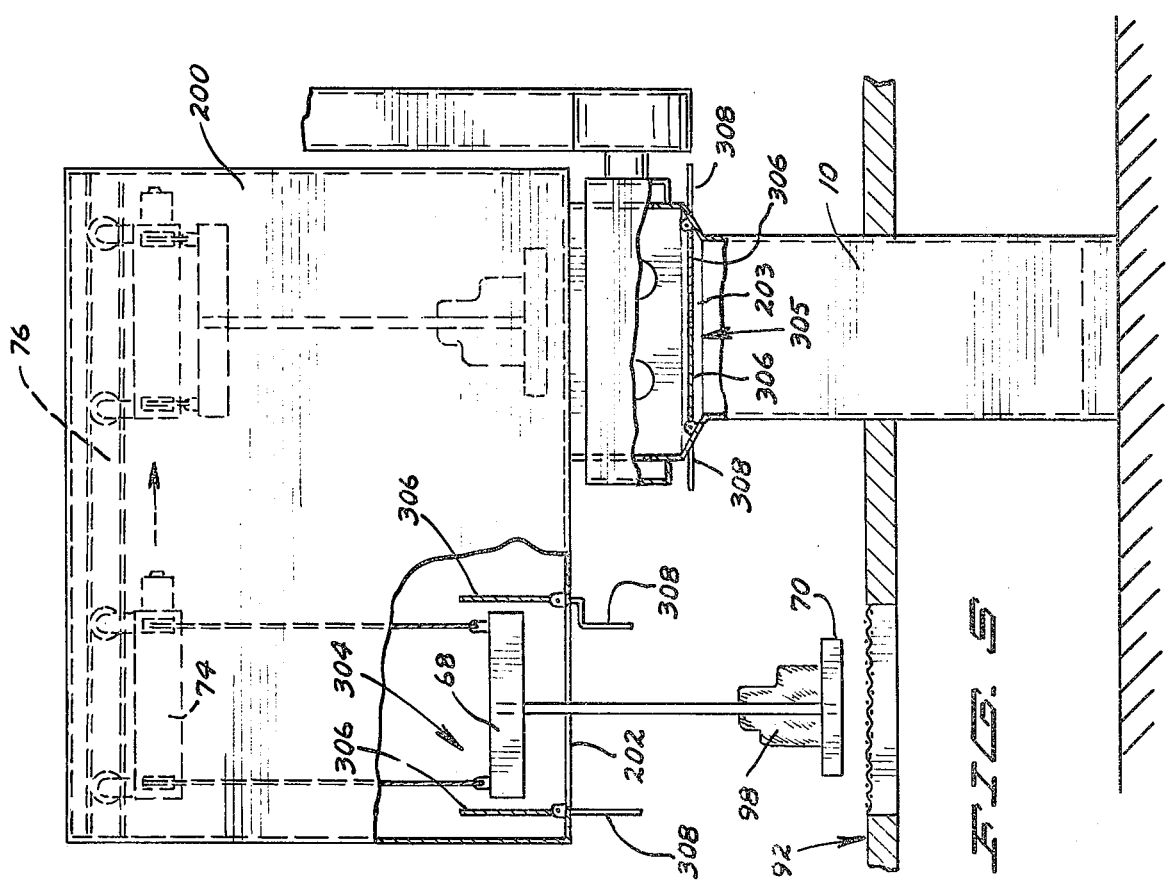

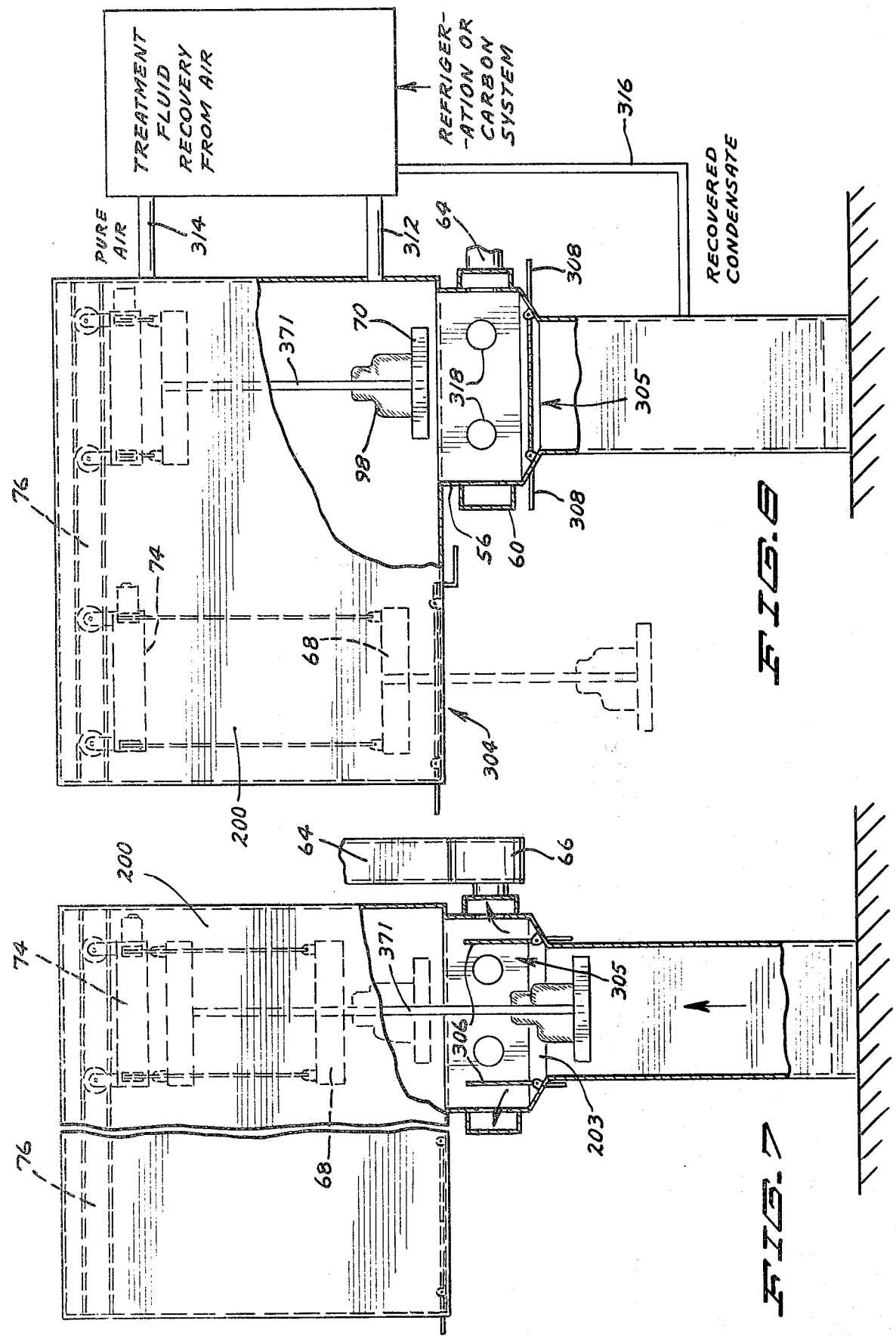

APPARATUS FOR SPRAYING AND OTHERWISE TREATING PIECES IN A VAPOR

BACKGROUND OF THE INVENTION:

This is a continuation-in-part of Application Ser. No. 171,129 filed Aug. 12, 1971 now abandoned.

This invention has relation to the treatment of work pieces by a volatile fluid in vapor phase and to the treatment of work pieces by spraying with a liquid while positioned in said vapor.

It has long been well known to degrease metal work pieces and/or to subject them to phosphatizing or other chemical treatment in a tank in which a two phase fluid is present, the liquid phase being subjected to heat sufficiently to form and maintain a vapor phase. It is also well known to utilize cooling coils near the top of such a tank to condense the vapor phase reaching that level and to utilize this purified condensate to spray the work and/or to return it to the liquid phase in the tank. See for example, U.S. Pat. Nos. 1,771,698; 1,869,826; 2,016,376; 2,861,897; and 3,015,576. See also the publication by DuPont entitled TRICLENE Trichlorethylene Phosphatizing, Catalog Number A-58617, dated June, 1968, pages 1 through 4.

While satisfactory results have been obtained using the teachings of the prior art, some of which are listed above, the process has been unnecessarily inefficient and costly. For example, when the solvent used is trichlorethylene, the boiling point is 188°F, and the vapor phase is 4½ times as heavy as air. Air will absorb 20 per cent by volume of these vapors it is exposed to. In the prior art, normal operation of the process resulted in alternately raising and lowering the upper level of the vapor in the tank. This caused a large volume of air to be drawn into the tank as the vapor level was lowered. This air absorbed much of the vapor and then was forced from the tank as the vapor level was again raised. In a typical installation of the prior art where there is a potential displacement of 660 cubic feet of air per cycle, that air would absorb 132 cubic feet of vapor per load. Three and one-half cubic feet of the vapor weigh one pound, and at 12 cents per pound, the operating rate was such that solvent loss was $10 per hour under full volume operation.

This solvent loss into the atmosphere also represents a pollution of the working atmosphere of the plant where the process is being carried on.

Several factors about the operation of the prior art process and apparatus contributed to the pick up of volatile solvent by air. These include the rapid lowering of the relatively cold work into the vapor which is at 188°F, resulting in rapid condensation of the solvent on the work piece with a consequent rapid lowering of the upper level of the vapor phase of the solvent and consequent drawing of air into the tank to replace the lost vapor.

The spraying of the work in position in the vapor, if done with high pressure sprays, results in an agitation of the vapor and of the spray material itself thus causing agitation in and above the upper level of the vapor phase of the solvent with consequent increased absorption by the adjacent air. This problem was "solved" only by the use of low pressure rinses and sprays which are not entirely adequate for accomplishing their purpose but which do tend to minimize the loss of the solvent into the atmosphere.

Rapid removal of the work pieces from the vapor phase of the treatment fluid resulted in volumetric displacement from the vapor phase which again caused the upper level of the vapor phase to drop. Further, after the work was lifted from the vapor phase, sprayed liquid run-off passes through the air as its flows back into the liquid phase in the tank, thus causing additional treatment fluid pick up by the air. During the treatment of the work, it becomes warmed or heated and the film of liquid on the work piece flashes over into vapor as soon as the piece hits the air, and this vapor is also lost to the extent it is absorbed into the air and not permitted to flow back into the vapor phase in the tank.

This flashover to vapor by the residual liquid phase on the work and stage after the stage leaves the tank is inhibited and finally stopped as the concentration of treatment fluid in the adjacent atmosphere approaches and reaches the 20 percent maximum absorption capability of that atmosphere. Liquid phase remaining on the work and stage at that point will be carried with the stage to the unloading dock where the relatively pure air will absorb the fluid thus seriously polluting that air and losing substantial quantities of the treatment fluid.

BRIEF SUMMARY OF THE INVENTION:

The improved features of the invention obviate the difficulties set out above. An open top treatment tank holds a treatment fluid which, when heated, will provide a heavier-than-air vapor phase above a liquid phase. Means are provided in the bottom of the tank for adding heat energy to the liquid phase and cooling means are provided at the top of the tank for condensing the vapor phase reaching that height to provide a relatively stable, predetermined upper limit for vapor in the tank. A stage is movably mounted with respect to the tank to lower work to be processed in through the open top of the tank and to remove it from the tank. A top lid or gate is also movably mounted with respect to the tank and means are provided for moving the lid into closing, sealing relationship with respect to the top of the tank after the stage has positioned the work at a desired working level within the tank, and for moving the lid into clearing relationship with respect to the tank as the stage and work are removed therefrom.

In the operation of a first form of apparatus for practicing the invention after the liquid and vapor phases of the treatment fluid are established by the heating and cooling means, the work is placed on the stage and the stage is lowered at a controlled rate into the top of the tank. The vapor phase is, of course, maintained at the boiling point of the treatment fluid, and when the relatively cold stage and work thereon come in contact with the vapor phase, there is an immediate condensation of the vapor on the surfaces of the stage and the work. In order to compensate for this loss of vapor and to prevent any appreciable drop in the upper level of the vapor, additional heat energy is applied to the liquid phase of the treatment fluid.

This condensation on the surfaces of the work continues until such time as the temperature of these parts is brought up to substantially the boiling point of the treatment fluid. Also, to further minimize any drop in the upper surface of the vapor phase, the rate at which the work is introduced into this phase is controlled. This can be done by lowering the stage uniformly at a very slow rate or by lowering the stage at a faster rate but stopping it to cause it to dwell at a series of different locations where the work is partially within and partially above the vapor phase, or a combination of these techniques can be used.

As the work is brought completely within the vapor, the lid is brought into closing relationship with the open top of the tank. One means of doing this, as illustrated herein, is by mounting the lid to ride above the stage. Other means include pivotally mounting the lid to swing between closed and open relation to the tank, also as illustrated herein.

Once the work has been so positioned inside of the tank and the lid is in place, the work can be subjected to gentle rinsing or violent spraying actinn utilizing the treatment fluid in the liquid phhase without the possibiility of the escape of vapor phase or even sprayed liquid phase from beneath the lid; and without the increased absorption of vapor caused by agitation of the interface of the vapor with an unlimited volume of air.

When the desired treatment of the work has been accomplished, the lid will be removed from sealing relationship with the top of the treatment tank and the work will be removed from the tank at a controlled rate such that liquid phase flowing from the work can pass back into the tank. Also, the removal of the work will cause a volumetric displacement within the vapor phase, and it is desirable that this happens at a slow enough rate so that the nominal upper level of the liquid phase can be maintained substantially constant. Furthermore, as the work, now approaching the approximate boiling temperature of the treatment fluid, leaves the vapor phase and comes into the air, there will be an immediate flashover of the liquid film of treatment fluid into vapor. It is desirable that the vapor so formed will tend to flow back into the vapor phase, thus to minimize the absorption of it into the air. This is accomplished by providing an upstanding collar constituted as part of the tank and extending upwardly from the point where the lid comes in closing relationship to the tank.

Again the controlled movement of the work material and stage from the tank can be by control of the lineal speed of the stage or, as illustrated and described herein, by operating this stage at a fixed rate of speed but by interrupting that operation at controlled points during the withdrawal process and for controlled lengths of time, or by a combination of these two methods.

In order to further insure that any residual liquid phase or vapor phase of treatment fluid initially clinging to the work and stage after removal from the treatment tank are prevented from getting into the atmosphere, in other forms of apparatus for practicing the invention, an upper chamber can be provided to encompass the stage and the work while it is moving between vertical alignment with its load-unload position, vertical alignment with the treatment tank, and as it moves into and out of the tank. In a second form of the invention, the lid will be carried upwardly with the stage as it leaves the treatment tank, and will move down with the stage as the stage is moved into its load-unload position, until it comes into sealing relationship with an upper chamber loading port opening.

In a third form of the invention, individual lids are provided for the upper chamber loading port opening and the treatment tank. In this form of the invention, the lids move out of the way when the stage and work pass respectively through the upper chamber loading port opening and the treatment tank opening, and are closed at all other times.

IN THE DRAWINGS:

FIG. 5 is a side elevational view of the apparatus of a third form of the invention, showing a treatment tank, a stage removed from that tank and in position to receive and discharge work pieces, and showing an upper chamber situated over the tank and the stage;

FIG. 6 is a side elevational view of the form of the invention as seen in FIG. 5 but with the stage situated in the treatment tank;

FIG. 7 is a side elevational view of the third form of the apparatus as seen in FIGS. 5 and 6, but showing the stage in the process of leaving the treatment tank, and showing in dotted lines the positioning of the stage after it has arrived in the upper chamber; and FIG. 8 is a side elevational view of the third form of the apparatus as seen in FIGS. 5 through 7, showing the stage inside of the upper chamber; and showing a schematic arrangement for purifying the solvent laden air present in the upper chamber.

DESCRIPTION OF PREFERRED EMBODIMENTS:

Apparatus of First Form of Invention.

Figure 1:
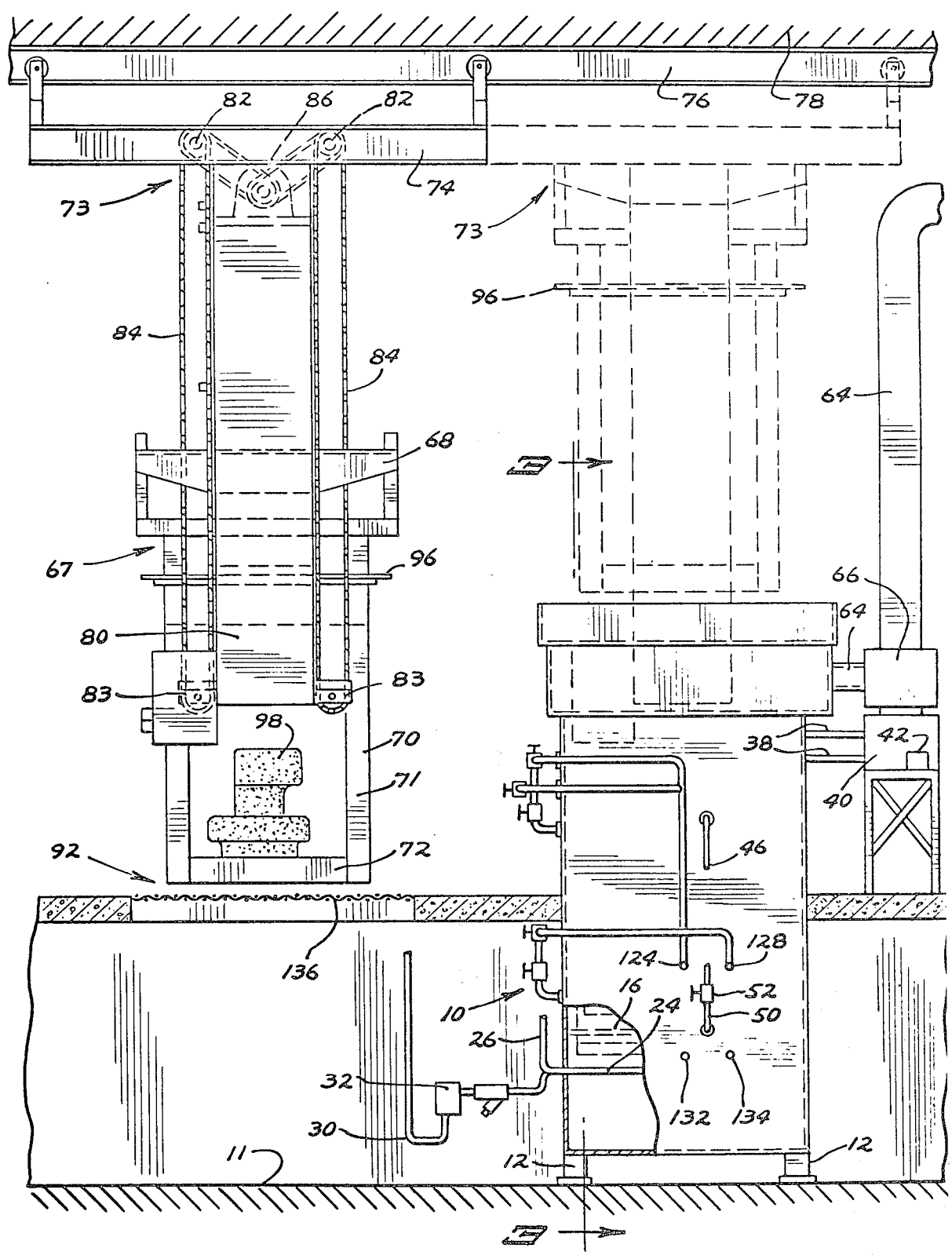
FIG. 1 is a side elevational view with parts in section and parts broken away of a first form of the apparatus of the invention showing in elevation a processing tank and a stage removed from that tank and in position to receive and discharge work pieces and showing in dotted lines the positioning of the stage just before entering or leaving the processing tank.
Figure 2:
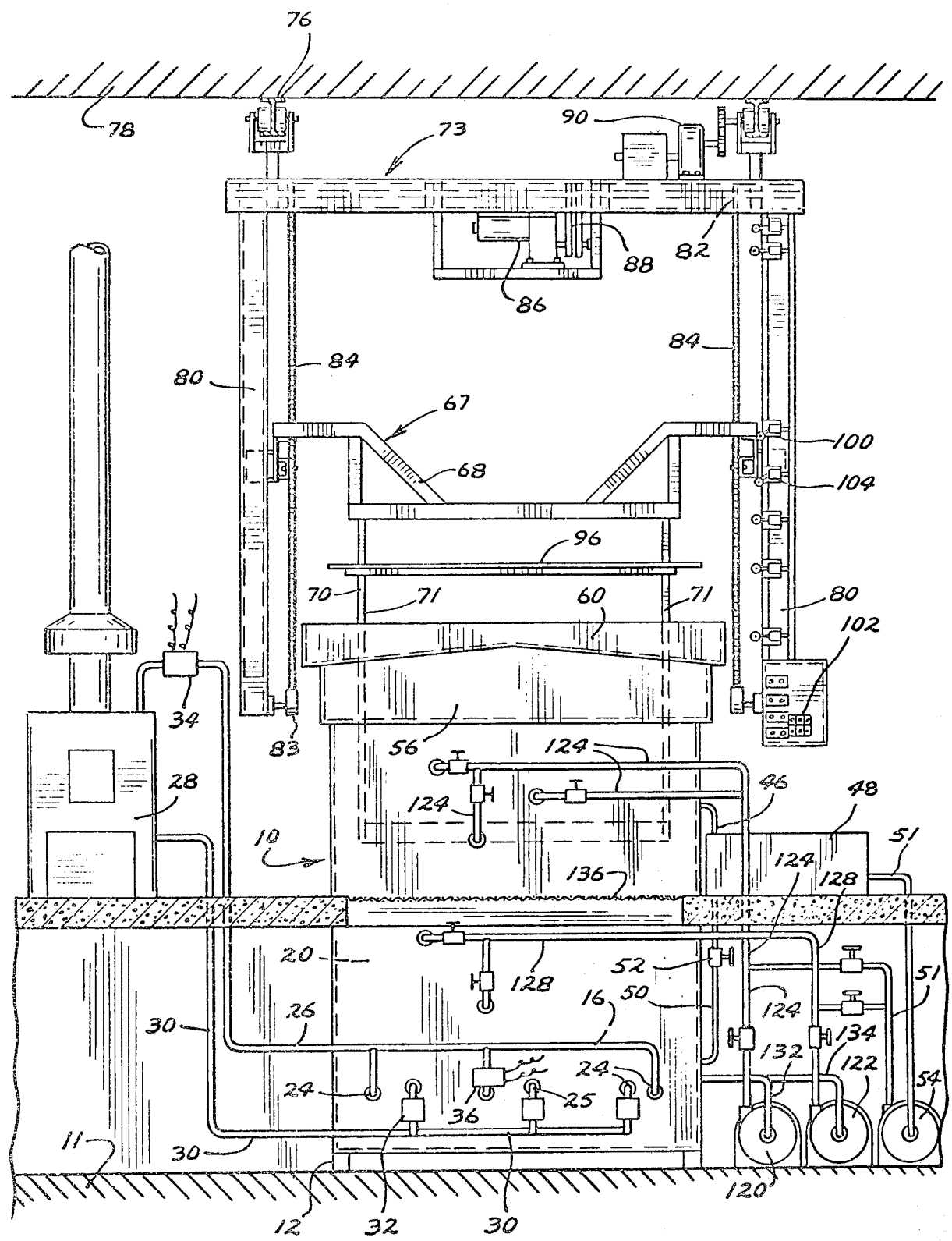
FIG. 2 is a front elevational view of the apparatus of the invention with parts in section and parts broken away.
Figure 3:
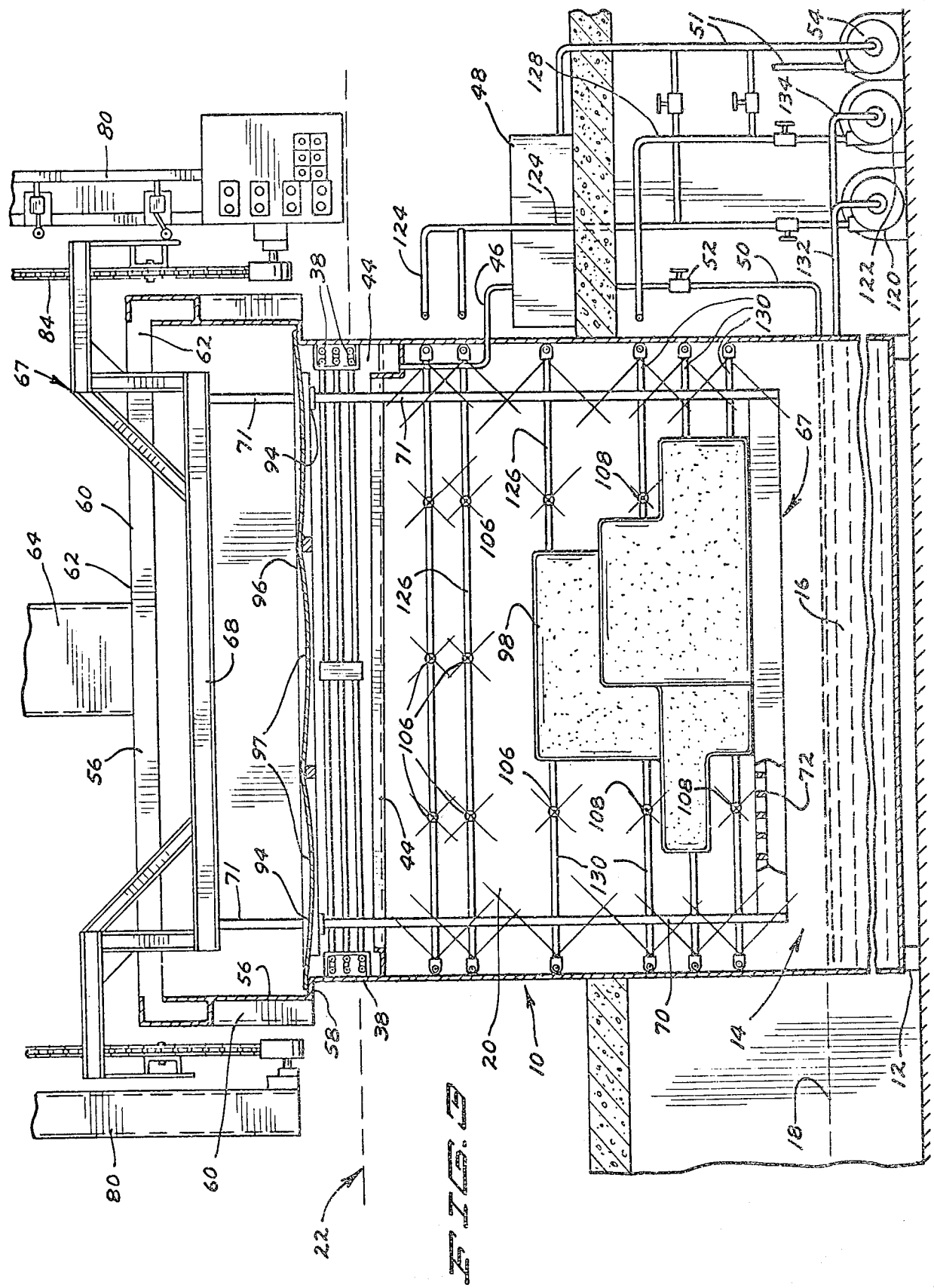
FIG. 3 is an enlarged vertical sectional view taken on the line 3—3 in FIG. 1, but with the stage positioned in the treatment tank.

In a first form of the invention as disclosed in FIGS. 1 through 3, an open top treatment tank 10 is supported on a basement floor 11 by legs 12. The tank is designed to operate with a two phase treatment fluid 14 in it, a liquid phase 16 existing below a lower construction line 18 and a vapor phase 20 existing above that line and below an upper construction line 22 approximately. A typical treatment fluid is trichlorethylene, and the remainder of the specification will concern the situation when this fluid is used. It is to be understood, however, that many solvents or other fluids which are capable of having a liquid phase and a vapor phase which is heavier-than-air can be successfully used in practicing this invention.

In order to generate and maintain a vapor phase above the liquid phase, in the first form of the invention as shown, a plurality of first steam coils 24 and second steam coils 25 extend into the lower part of the tank in which the liquid phase 16 is to be maintained. These first and second steam coils are fed from a common steam header 26 which receives its steam from a steam generator 28. A return line 30 is provided for the coils through a suitable steam separator 32 to the steam generator 28. A first solenoid operated steam valve 34 controls the supply of steam in the header 26, and a similar second solenoid operated valve 36 controls the supply of steam to the second steam coils 25. Application of heat energy in the form of steam through the coils 24, and at specific times through coils 25, causes the liquid phase to boil and causes vapor to form. In the case of trichlorethylene, for example, this vapor will be approximately 4½ times heavier than the atmosphere, and it will lie in the tank 10 and build up as a level layer of cloud or fog of vapor.

In order to positively limit the upper level of this fog or cloud of vapor, a plurality of cooling coils 38 are situated around the upper peripheral edge of the tank. A suitable coolant in these coils is cooled or refrigerated by a cooling unit 40 which is put into operation by the solenoid 42 situated thereon. These coils are open to the vapor as it rises in the tank, and the vapor reaching the coils will condense back into liquid phase, will flow into a gutter 44 beneath the coils and will return by gravity to the liquid phase in the tank through condensate return line 46. The supply of purified, condensed treatment fluid from line 46 can conveniently be stored in a condensate collection tank 48, and make up line 50 leads from the tank 48, through valve 52 and to the treatment tank 10. Valve 52 can be opened as needed to return condensate to the treatment fluid in the tank 10. When it is desired that the work be sprayed with pure condensate, for example during a final rinse, a condensate spray pump 54 is used to supply the spray heads through a line 51 and appropriate valving.

In order to further insure that all of the treatment fluid 14 is confined in the area of the tank, an upstanding tank collar 56 is contiguous with the entire top edge of the tank and extends upwardly therefrom from a tank lid receiving shoulder 58. To guard against any of the noxious or other vapors from the treatment fluid entering into the atmosphere adjacent to the apparatus, the air is constantly evacuated outwardly from around the entire upper edge of the tank collar 56. This is done by providing a ventilator hood 60 fixedly supported (by means not shown) with respect to the tank collar. The hood is spaced from the collar and provides, with the collar, an air gap 62 through which the air and any vapors at the top of the collar are evacuated between the collar and the hood and out through exhaust ducts 64 and a centrifugal exhaust fan 66.

In order to get the work materials which are to be processed by the apparatus into the tank for processing, a movable stage assembly 67 is provided. This stage assembly includes an upper stage frame 68 from which a stage 70 depends. Stage 70 includes four vertical stage legs 71 hanging from the four corners of the stage frame and an open grid stage floor 72 through which vapor and liquid can freely pass.

The stage frame of the stage assembly is suspended from a carriage assembly 73 including a carriage 74 which is suspended from upper horizontal tracks 76 attached to the ceiling 78 in any suitable manner. Supported from the carriage 74 and hanging downwardly therefrom to form part of the carriage assembly 73 are two vertical legs, 80, 80. At an upper portion of each of these legs, two drive sprockets 82, 82 are supported; and at aligned lower portions thereof, driven sprockets 83 and 83 are likewise rotatably supported on each leg.

Four continuous roller chains, each designated 84, run one over each set of vertically aligned sprockets. One of the flights of each of these chains is permanently fastened to a portion of the stage frame 68. On the underside of the carriage 74, an electric motor 86 together with appropriate gearing and other drive mechanisms 88 are mounted in such a manner that the motor can be operated in a first direction to cause the sprockets 82 to move the roller chains in direction to raise the stage and in a second, reverse direction to cause the stage to be lowered.

Suitable means 90 are also provided for driving the carriage assembly 73 from a rearward position with the stage assembly in alignment with the treatment tank 10, as seen in dotted lines in FIG. 1, to a forward position clear of the treatment tank and in alignment with a loading area 92 as seen in full lines in that figure. A grid floor 136 is provided at the loading area to allow any spillage through the stage floor 72 to pass through the grid floor and out of the loading area 92.

The vertical stage legs 71 are each equipped with a stop arm 94, as best seen in FIG. 3, positioned to support a tank lid or gate 96. The lid is free to slide vertically upwardly with respect to the legs 71, but cannot move down below the stop arms 94.

Operation of First Form of Invention.

In operation, the stage assembly will be positioned approximately as seen in full lines in FIG. 1 and the work to be processed is placed on the stage floor 72. As shown, the work material is characterized as a large and bulky work piece or series of work pieces 98, but it is to be understood that the apparatus will be effective to treat all surfaces of all sizes and shapes of work from the smallest to the largest from flat forms to intricate shapes. The stage will then be raised sufficiently to clear the hood 60 and the carriage assembly 73 will be rolled back until the stage is precisely in alignment with the open top tank 10 as seen in dotted lines in FIG. 1.

With the cooling coils 38 being cooled and with the treatment fluid properly heated and receiving heat from first steam coils 24 to cause the vapor phase to exist between construction lines 18 and 22, and with the liquid phase 16 existing from the lower construction line 18 to the bottom of the tank, the stage 70 and the work 98 are lowered into the tank. The vapor phase exists, of course, at the temperature of the boiling point of the treatment fluid. For example, in the case of trichlorethylene, this is 188°F. As soon as the stage and the work are immersed in the vapor, the vapor will immediately condense on their relatively cold surfaces and will flow back into the tank. If this is not compensated for, the level of the vapor will drop appreciably below the construction line 22, and air will be drawn into the upper portion of the tank to fill the void, only to be forced out later as the vapor phase recovers. As pointed out above, this results in excessive absorption of the vapor into the air, and is highly objectionable. Accordingly, in anticipation of the stage and work moving into the vapor, second solenoid operated steam valve 36 is energized to feed steam to coils 25 thus providing additional vapor boil-off to compensate for the condensation taking place as the work is brought up to temperature.

After the work is partially into the vapor, an outwardly extending portion of the stage frame 68 comes in contact with a first interrupter switch 100 which interrupts the power to the motor 86 and activates one of a series of timers 102. The power to motor 86 remains off until the timer has completed its cycle at which time the stage will again be lowered until a second interrupter switch 104 is contacted to once again interrupt the power to the stage vertical drive motor and to activate another of the timers 102. This process will continue at a rate such that the level of the vapor in the treatment tank is not appreciably disturbed and until the work has been brought up to temperature.

As the work approaches the limit of its downward travel to position within the vapor phase 20 of the treatment fluid, the tank lid 96 will come into sealing relation with the tank lid receiving shoulder 58 of the treatment tank. Any liquid within the upstanding tank collar 56 which falls on the tank lid 96 will flow back into the tank through openings 97 provided in the concavities which make up the tank lid.

The condensation of the vapor on the work in the tank is performing some of the desired treatment of the work in some cases. In other words, the condensate in flowing down off over the work is carrying off grease and other impurities from it.

When the vapor treatment portion of the process has been accomplished, the work may be immersed in the liquid phase, to cause phosphatizing for example, if this is desired; or it may be, as illustrated, subjected to a phosphatizing or washing action from a plurality of upper spray heads 106 and lower spray heads 108.

It is to be understood that the presence of the tank lid 96 allows the use of high pressure sprays through the upper and lower spray heads. This is to be contrasted with the procedure utilized in the case of open tanks. In this situation, low pressure sprays had to be used in order to keep the volatile or vaporized fractions of the treatment fluid from being mixed with the air due to the agitation of the interface between the vapor and the atmosphere. It is to be noted that the only air which can absorb the constituents of the vapor phase is that between upper construction line 22 and the tank lid 96. Peripheral portions of this are in contact with the cooling coils 38, so even some of the vapor in this area is constantly being recaptured.

Because of the high density of the liquid phase of the treatment fluid, it has been found that it is advantageous to utilize two separate spray pumps, 120 and 122, with the first spray pump 120 feeding through pipes 124 to reach upper spray headers 126 which feed the upper spray heads 106. As perhaps best seen in FIG. 2, hand operated valves are provided in the pipes 124 so that one or any combination of the upper banks of spray heads can be utilized depending on the nature and location of the work within the tank or for any other reason.

Second spray pump 122 feeds pipe 128 which in turn carries the spray to lower spray headers 130 which feed lower spray heads 108. Here again suitable valving is present along pipe 128 to allow either one or both or neither of these lower spray heads to be utilized. In many cases, the liquid sprayed is taken from the liquid phase 16 in the treatment tank. This is illustrated in FIGS. 1 and 2 where pipes 132 and 134 lead from the lower portion of the tank 10 to the pumps 120 and 122 respectively. In some instances, for example during final rinse, the liquid sprayed will come directly from the condensate collection tank 48 by means of condensate pump line 51 and condensate spray pump 54.

When the spray cycle has been completed, the stage and work will be started on an upward journey. As soon as the stop arms 94 come up underneath the tank lid 96, the tank lid will begin to rise with the stage. This movement will be made slow enough so that unnecessary turbulence is not introduced. The interrupter switches will be contacted in opposite direction and in opposite sequence by the stage frame 68, and these serve to interrupt the upward movement of the work to allow the spray liquid to drain from the work. As the now heated work emerges from the vapor phase, the thin film of liquid thereon will immediately flashover into vapor phase. The slow movement and/or interruption of movement of the work as it leaves the tank will permit this heavier-than-air vapor to flow back into the tank with the rest of the vapor phase.

As the tank lid proceeds up past the upper edge of the tank collar, and before it begins to constrict the air gap or opening 62 between the collar and the hood, all of the air flow through the hood is from the outside atmosphere and the amount of vapor which can go into the room at this stage is kept to an absolute minimum. As the lid reaches and passes the top edge of the hood 60, the air which was trapped underneath the lid will be substantially entirely evacuated through the hood and the ventilator ducts to the outside. It is only the vapor which has been absorbed by this small air mass which is lost and which must be made up in subsequent cycles.

The timers 102, as shown, are of a type which are adjustable, and the amount of time that the stage dwells under the control of each timer can be varied as needed to satisfy the nature and volume of the work and the nature of the process to be performed. Alternatively, means can be provided for adjusting the speed of the motor carrying the stage down into the tank and/or bringing it up from the tank to accomplish the same purpose. Although not illustrated herein, vapor sensors can be located in or adjacent the tank to determine the speed of ascent and descent into the tank and/or the amount of heat added to the liquid phase in order to maintain the top of the vapor phase at a substantially uniform predetermined optimum level.

Apparatus of the Second Form of the Invention.

Figure 4:
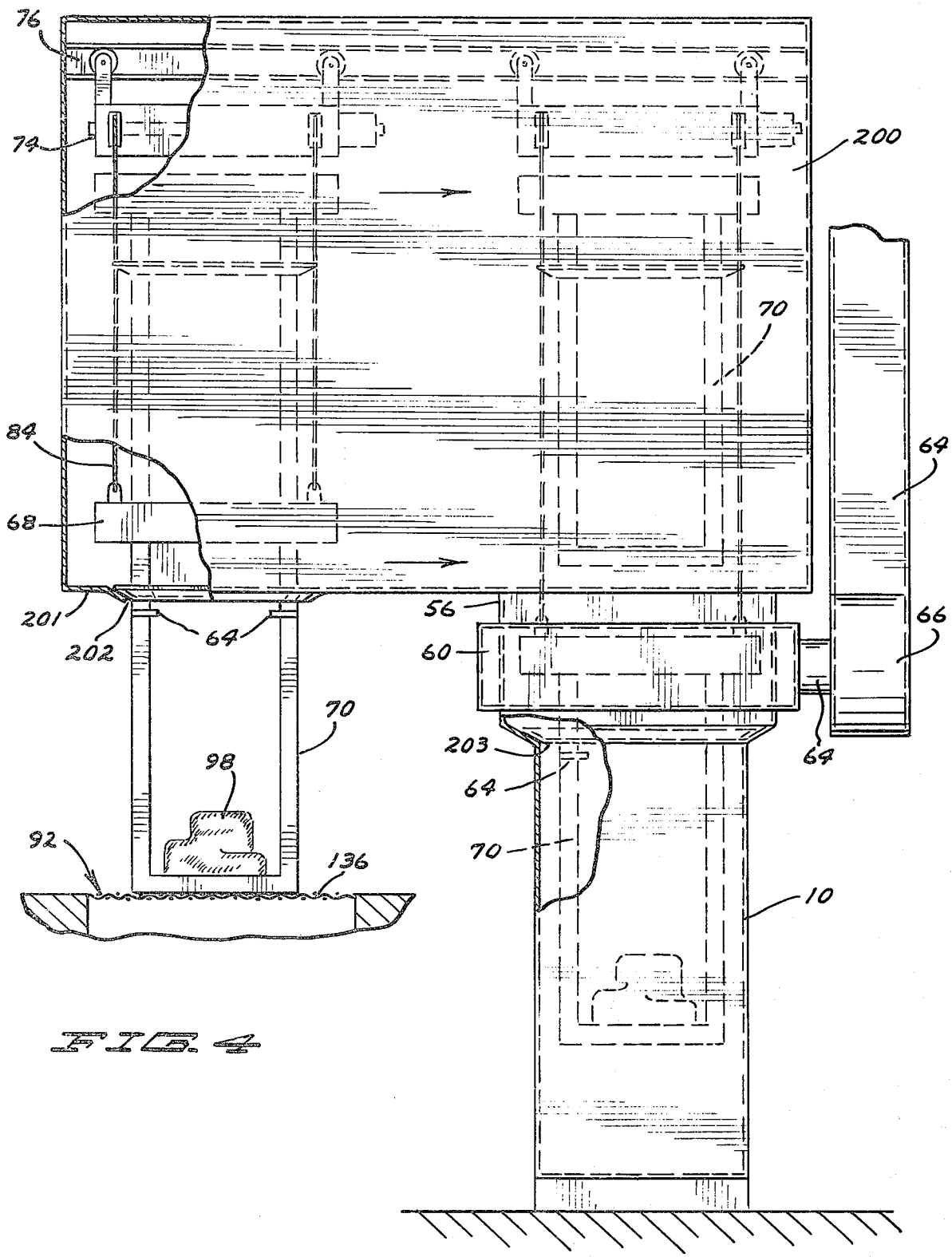
FIG. 4 is a side elevational view of the apparatus of a second form of the invention showing in elevation a treatment tank and a stage removed from that tank and in position to receive and discharge work pieces, showing an upper chamber associated with the stage and tank, and showing in dotted lines the stage and lid in position in and on the tank.

In a second form of the invention as illustrated in FIG. 4, an open top treatment tank 10 similar to that shown in the first form of the invention is disclosed. The details of the apparatus for establishing the two phase treatment fluid in this tank are ommitted for purposes of clarity, but could be as shown in connection with the first form of the invention, for example. Also similar to the showing of the first form of the invention is the stage 70, four vertical stage legs 71 connecting the stage to upper stage frame 68, a tank lid or gate 96 stop arms 94 mounted on stage legs 71 horizontal tracks 76, a carriage 74, a loading area 92, and a grid floor 136. Exhaust ducts 64 and a centrifugal fan 66 can be provided for carrying away air which has absorbed part of the vapor phase of the treatment fluid for discharge outside of the treatment area or for reclaiming as will be explained in detail in connection with the third form of the invention.

Roller chains 84 and suitable sprockets controls, motors, etc. can be provided for raising the stage 70 and work pieces 98 from the loading area 92 so that they can be carried to vertical alignment with the open top treatment tank 10 and lowered into that tank.

Novel to the second and third forms of the invention is an upper chamber 200 which, as shown in FIG. 4, includes spaced apart top and bottom walls, front and back walls and side walls. All these walls are air tight and are in air tight relationship with respect to each other with the single exception of the bottom wall 201 which is provided with a stage loading entrance 202 and a stage treatment entrance 203. As shown in FIG. 4, this stage treatment entrance is shown as being at the bottom of an upstanding tank collar 56 which is similar to that shown in the first form of the invention; but is to be understood that this treatment entrance could be integral with the connection of that upstanding collar 56 with the horizontal portion of the bottom wall 201.

Operation of Second Form of the Invention.

As explained in connection with the first form of the invention, it is important that all air in which any of the volatile phase of the treatment liquid is entrained is entirely relieved of that treatment liquid. Since the development of the first form of the invention, this has become increasingly important from the standpoint of the economic losses occasioned by the loss of treatment fluid into the atmosphere; but ever so much more importantly from the standpoint of the pollution of the atmosphere occasioned by such losses of deleterious vapor phases of treatment fluids into the atmosphere. Accordingly, the structures of the second and third form of the invention were developed.

In operation, in the second form of the invention, the stage 70 is loaded with work pieces 98 while it is situated in the loading area 92, and the mechanism such as shown in connection with the first form of the invention, or of any other usual or preferred nature, is utilized to lift the stage vertically upwardly from the position as seen in FIG. 4. As soon as the lid or gate 96 is contacted by stop arms 94, it travels upwardly with the stage. This upward movement is continued until the stage is entirely within upper chamber 200, at which time, the carriage 74 is rolled on the horizontal track 76 until the stage has position directly above the treatment tank 10, as indicated in the upper right-hand corner of FIG. 4. At this point, the stage is lowered down into the treatment tank 10 in the manner described in connection with the first form of the invention, the cover 96 coming into sealing relationship with the stage treatment entrance 203 when the stage reaches its lowermost position inside of the treatment tank.

When situated inside of the tank, the treatment takes place as explained in connection with the first form of the invention, all of the vapor phase and liquid phase being trapped or sealed underneath the tank lid 96. When the treatment is completed, and the stage 70 is again raised, there will be, as suggested in connection with the first form of the invention, some slight, or even substantial, absorption of the treatment fluid into the ambient air directly above the treatment tank.

In a case of the apparatus of the first form of the invention, this fluid, now in its vapor phase, was quickly dissipated into the atmosphere and lost. More importantly, the atmosphere was polluted.

In the second form of the invention as shown in FIG. 4, however, when this absorption of vapor and liquid phase of the treatment fluid is taking place directly above the treatment tank, all of the flow of air into the upper chamber 200 will necessarily be through the stage loading entrance 202, across the interior of the upper chamber 200, down through the upstanding tank collar 76, and out through a ventilator hood 60 similar to the one shown in connection with the first form of the invention, for example. As pointed out above, from there the air, with entrained or absorbed treatment fluid can be discharged through exhaust ducts 64 and centrifugal exhaust fan 66 to a system from which the treatment fluid can be removed from the air. Such a system is disclosed in FIG. 8 in connection with the third form of the invention.

After sufficient air exchange has taken place to insure that virtually all of the treatment fluid has been removed from the upper chamber 200, the stage can again be moved horizontally until it is positioned over the stage loading entrance 202, and then it can be lowered through that entrance until such time as the tank lid 96 again comes into sealing relationship with the stage loading entrance 202. It is evident that as the stage moves vertically downwardly through the stage loading entrance, the flow of air as described above will carry any vapor phase of the treatment fluid across the interior of the upper chamber and out through ducts 64.

While the stage is being unloaded with the treated work pieces 98 and other untreated work pieces 98 are being placed thereon, the vapor phase in the treatment tank 10 will have an interface with the air coming from inside of the upper chamber. Inevitably there will be some appreciable absorption of this vapor phase into the air, but because of the sealing relationship between the tank lid 96 and the stage loading entrance 202, there will be no opportunity for this vapor phase of treatment fluid to be absorbed into the atmosphere surrounding the loading area 92, even if the apparatus is idle for extended periods, as over a luncheon break, or even over a nighttime of inactivity, for example.

Apparatus of Third Form of Invention:

In FIGS. 5 through 8, apparatus is disclosed in accordance with a third form of the invention. Treatment tank 10, upstanding tank collar 56, ventilator hood 60, centrifugal fan 66, ducts 64, upper stage frame 68, stage 70, carriage 74, and horizontal tracks 76 as detailed in the first form of the invention are conventionally shown in these figures. However, the four vertical stage legs 71 of the first and second forms of the invention are replaced by a pair of vertically extending legs 371, only one of which is shown.

An upper chamber 200 of the character as described in connection with the second form of the invention is conventionally shown, and the bottom wall 201 is again provided with a stage loading entrance 202 and a stage treatment entrance 203. The lid or gate 96, however, is replaced by a stage loading entrance gate 304 and a stage treatment entrance gate 305.

Each gate consists of a pair of opposed doors 306 pivotally mounted as at 307 to opposite sides of the entrances 202 and 203.

Means is provided for opening and closing these doors at appropriate times to cause the gates to come into sealing closing relationship to their respective entrances; and this means, typically, will be automatic in its operation. However, for the purposes of simplicity, this means has been disclosed herein as manually operable handles 308 connected to the pivot points 307, which extend outside of the upper chamber 200 to the rear as seen in FIGS. 5 through 8.

Operation of Third Form of the Invention:

As seen in FIG. 5, the stage 70 has been loaded with work pieces 98 at loading area 92, and doors 306 of the stage loading entrance gate 304 have been opened by the use of handles 308 to permit the stage to be brought up to the interior of the upper chamber 200. When this point is reached, the doors 306 will be closed thus allowing the gate 304 to come into sealing relation to stage loading entrance 202, as seen in dotted lines in FIG. 6. The stage will then be moved horizontally to position directly over treatment tank 10, and doors 306 of the stage treatment entrance gate 305 will be opened long enough to allow the stage 70 and work pieces 98 to pass into the tank 10, in the manner described in connection with the first form of the invention. Utilizing handles 308, the doors will then be closed to come into sealing relationship with the stage treatment entrance 203. Slots and/or flaps can be provided in the outer edges of the doors 306 to allow these doors to come into sealing relationship to the two vertical stage legs 371.

After the treatment has taken place in the treatment tank, the stage 70 will again be lifted up, and the doors 306 of gate 305 will be brought to position as seen in FIG. 7, until such time as the work pieces 98 and the stage 70 arrive at the position as shown in full lines in FIG. 8. At this point, gate 305 will again be closed utilizing the handles 308, for example, and any air in the upper chamber 200 which has absorbed treatment fluid will be processed out through the hood 60 and ducts 64, either to a distant location or to an apparatus for recovering the treatment fluid from the air.

Next the work pieces 98 and stage 70 are moved back into vertical alignment with the stage loading entrance 202, the stage loading entrance gate 304 is opened, and the stage lowered to the loading area 92 where the work pieces can be removed, and the cycle repeated.

Shown schematically on FIG. 8 is a system for recovering the vapor phase of the treatment fluid from the air inside of the upper chamber 200. This system includes the removal of the air from a bottom portion of the upper chamber through a conduit 312, the subjecting of the air from that conduit to a refrigeration or carbon system for removing the vapor phase of the treatment fluid, and the return of the purified air from this treatment back into an upper portion of the upper chamber 200 through a conduit 314. The treatment fluid is recovered in its liquid form, and a condensate return line 316 is provided for returning this recovered condensate back into the treatment tank 10.

A refrigeration system of recovering the treatment fluid from the air coming from the upper chamber 200 will be effective as will a carbon system. Other systems could also be effective.

It is to be understood that the air evacuated from above the vapor phase in a treatment tank, through the upstanding tank collar 56, can also be sent through a similar recovery system.

In the form of the invention as seen in FIGS. 5 through 8, the upstanding collar 56 is provided with exit ports 318 opening into the hood 60, rather than with the construction as set out in connection with the first form of the invention.

The embodiments of the invention in which an exclusive property or privilege is claimed are defined as follows:

1. In an apparatus for treating work pieces in a vapor, including an open top tank, a treatment fluid having a liquid phase and a heavier-than-air vapor phase, means for applying heat energy to a bottom portion of said tank to cause said fluid to boil to form in said tank a layer of vapor phase and a layer of liquid phase, cooling means at the top of said tank to condense said vapor phase reaching said cooling means to limit the upper level of vapor in said tank, a stage for receiving work pieces to be processed, and means for lowering said stage into and raising said stage out of said tank through the open top thereof, the improvement comprising:
 a. a tank lid of configuration to completely close the open top of said tank;
 b. means for bringing said lid into closing relationship to said open tank top when said work is positioned within said tank and to move said lid into open relationship with said tank as the work leaves the tank;
 c. said means for moving said lid including means for carrying said lid on an upper portion of said stage in alignment with said treatment tank opening; and
 d. said tank being provided with a tank lid receiving shoulder around the entire periphery thereof to receive the entire outer edge portion of said tank lid and a vertical upstanding collar constituting part of said tank and extending upwardly from the outer periphery of said lid receiving shoulder.

2. The combination as specified in Claim 1, and a hood fixedly mounted with respect to and spaced from the outer surface of said tank collar, the hood terminating above the outer peripheral edge of such collar in spaced relation thereto, and ventilating means to withdraw air from said hood and to deliver it away from the area of said tank.

3. The combination as specified in Claim 1, additional heat energy means, means operable to activate said additional heat energy means to generate additional vapor in said tank to compensate for condensation of vapor caused when the relatively cold work is lowered into the tank and into the vapor.

4. The combination as specified in Claim 3, and means for controlling the rate of descent of the stage and work into the vapor phase layer to substantially maintain the predetermined upper vapor level in said tank.

5. The combination as specified in Claim 4, and means operable for controlling the rate of withdrawal of the work from the tank to allow the liquid phase treatment fluid to substantially completely flow back into the tank before the work rises above the top of the collar.

6. The combination as specified in Claim 1, and a plurality of spray heads in said tank in horizontal alignment with at least portions of said work, spray headers connecting said heads, and means for pumping a treatment liquid through said spray headers and spray heads to impinge on said work when said lid is in closing relationship to said lid receiving shoulder of said tank.

7. In an apparatus for treating work pieces in a vapor, including an open top tank, a treatment fluid having a liquid phase and a heavier-than-air vapor phase, means for applying heat energy to a bottom portion of said tank to cause said fluid to boil to form in said tank a layer of vapor phase and a layer of liquid phase, cooling means at the top of said tank to condense said vapor phase reaching said cooling means to limit the upper level of vapor in said tank, a stage for receiving work pieces to be processed, and means for lowering said stage into and raising said stage out of said tank through the open top thereof, the improvement comprising:

a. a tank lid of configuration to completely close the open top of said tank;

b. means for bringing said lid into closing relationship to said open tank top when said work is positioned within said tank and to move said lid into open relationship with said tank as the work leaves the tank;

c. a vertical upstanding collar constituting part of said tank and extending upwardly from the point where said lid is situated when it completely closes the tank top;

d. a hood fixedly mounted with respect to and spaced from the outer surface of said collar, a passageway being provided between said collar and said hood for flow of air between said collar and said hood;

e. and ventilating means to withdraw air from said hood and to deliver it away from the area of said tank;

f. an airtight upper chamber positioned to encompass said stage after it has been raised out of said tank, said chamber having a bottom wall;

g. means for moving said stage laterally within said upper chamber to vertical clearing relation to said tank;

h. said upstanding collar being open to the interior of said chamber through the bottom wall of said chamber;

i. said bottom chamber wall being provided with a stage loading entrance horizontally spaced from said tank; and j. means to lower said stage through said stage loading entrance.

8. The combination as specified in claim 7 wherein a stage loading entrance gate is mounted to move between closing and clearing relation to said stage loading entrance in said bottom wall; and means to move said stage loading gate into closing relation to said entrance after said stage has passed out of said upper chamber through said entrance.

9. The combination as specified in claim 8; means to move said stage loading gate into closing relation to said entrance after said stage has been moved back inside said chamber through said entrance; means to move said tank lid to closing relation to said tank top when said stage is in said tank and when said stage is in said upper chamber; means to move said stage loading gate to clearing relation to said entrance to allow said stage to pass through said entrance; and means to move said tank lid to clearing relation to said tank top to allow said stage to pass into and out of said tank.

10. In an apparatus for treating work pieces in a vapor, including an open top tank, a treatment fluid having a liquid phase and a heavier-than-air vapor phase, means for applying heat energy to a bottom portion of said tank to cause said fluid to boil to form in said tank a layer of vapor phase and a layer of liquid phase, cooling means at the top of said tank to condense said vapor phase reaching said cooling means to limit the upper level of vapor in said tank, a stage for receiving work pieces to be processed, and means for lowering said stage into and raising said stage out of said tank through the open top thereof, the improvement comprising:

a. a tank lid of configuration to completely close the open top of said tank;

b. means for bringing said lid into closing relationship to said open tank top when said work is positioned within said tank and to move said lid into open relationship with said tank as the work leaves the tank;

c. a vertical upstanding collar constituting part of said tank and extending upwardly from the point where said lid is situated when it completely closes the tank top;

d. an airtight upper chamber positioned to encompass said stage after it has been raised out of said tank, said chamber having a bottom wall;

e. means for moving said stage laterally within said upper chamber to vertical clearing relation to said tank;

f. said upstanding collar being open to the interior of said chamber through the bottom wall of said chamber;

g. said bottom chamber wall being provided with a stage loading entrance horizontally spaced from said tank; and h. means to lower said stage through said stage loading entrance.

11. The combination as specified in claim 10 and means for purifying air in said upper chamber including means for withdrawing treatment fluid vapor laden air from a lower portion of said chamber, means for extracting and condensing to liquid phase the treatment fluid from said air; and means for returning the resulting purified air back to an upper portion of the chamber.

12. The combination as specified in claim 11 and means for returning the recovered condensate back for use in said treatment tank.

* * * * *